Jan. 14, 1941.   P. F. SPERRY   2,228,855
PROJECTOR AND GATE MECHANISM THEREFOR
Filed Feb. 9, 1940   2 Sheets-Sheet 1
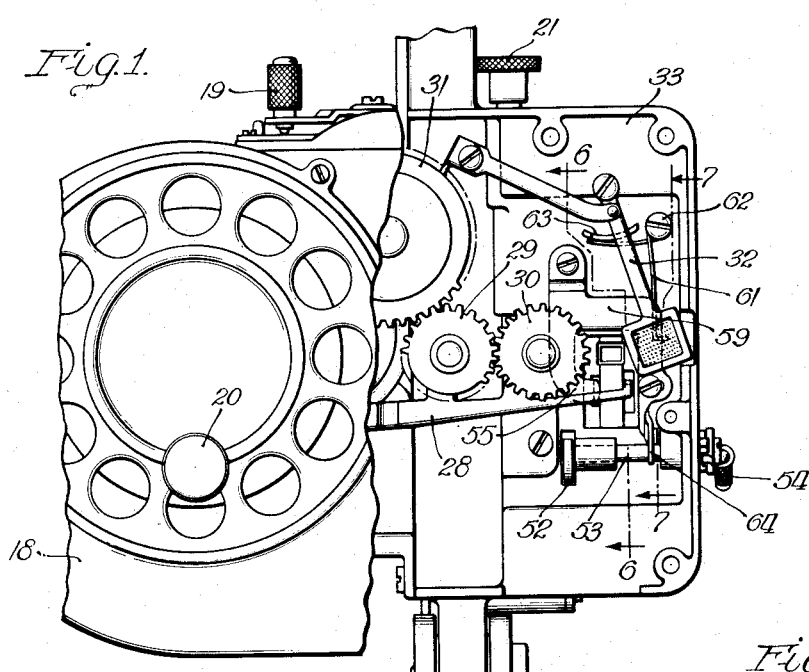
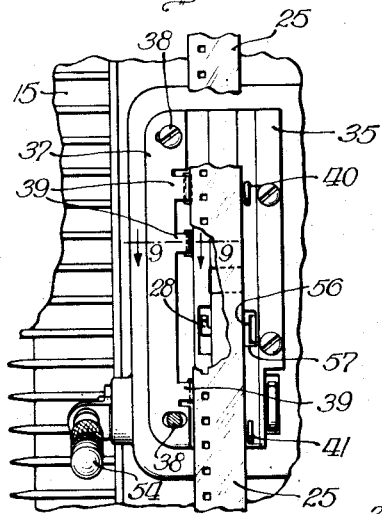
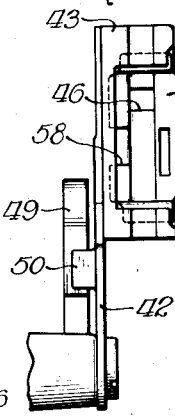
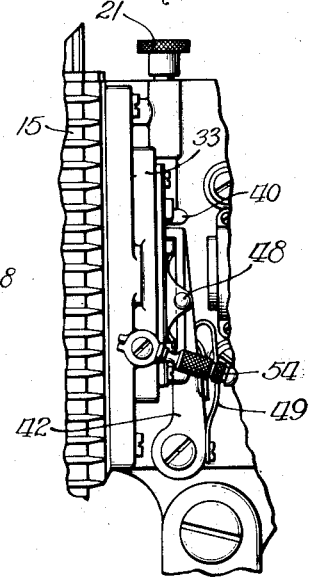
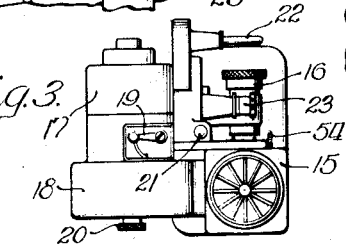
INVENTOR,—
Philmore F. Sperry,
BY *Zabel, Carlson, Gritzbaugh and Wiles,*
ATTORNEYS.

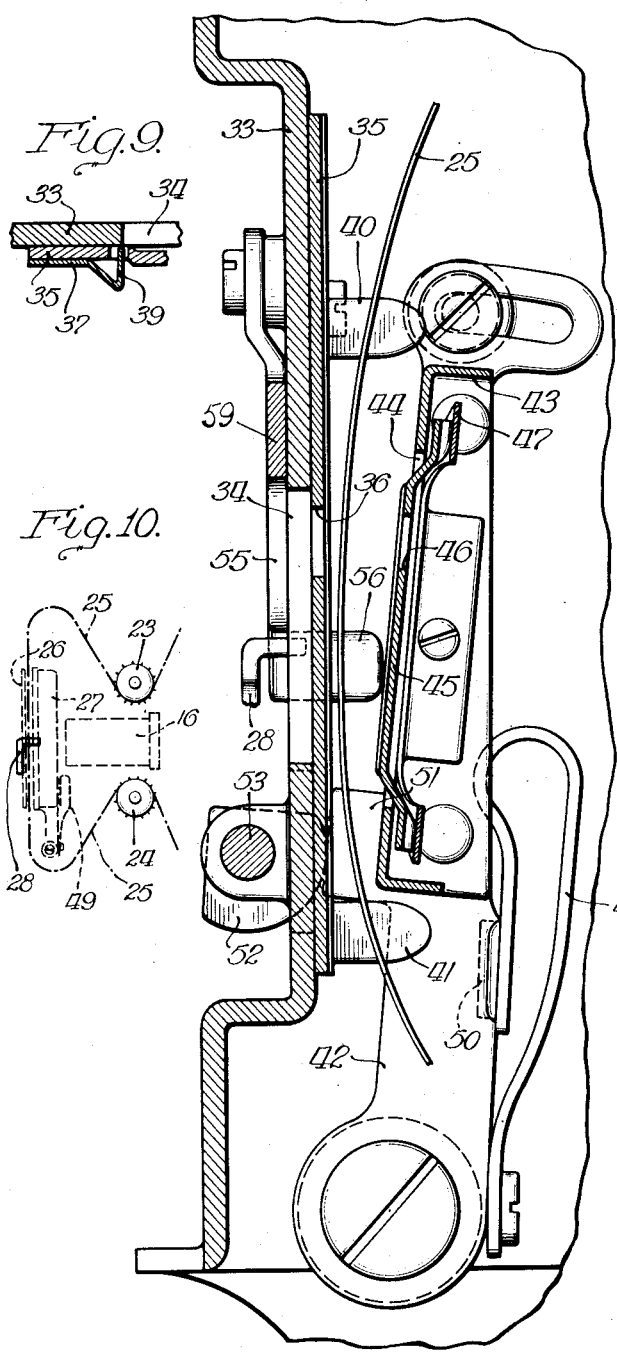

Patented Jan. 14, 1941

2,228,855

UNITED STATES PATENT OFFICE 2,228,855

PROJECTOR AND GATE MECHANISM THEREFOR

Philmore F. Sperry, Chicago, Ill., assignor to Revere Camera Company, Chicago, Ill., a corporation of Delaware Application February 9, 1940, Serial No. 318,015

5 Claims. (Cl. 88—17)

This invention relates to projectors and particularly to the gate mechanism by which a film is held in position for the passage of the ray of light therethrough. It is the principal object of the invention to provide an improved form and arrangement of parts by which improved guiding means is provided for holding the film in the desired operative position and by which such guiding means is made capable of yielding readily for the passage of a portion of film of excessive width such as often results from a quickly made splice in the film.

In the arrangement illustrated, a plurality of guide lugs are provided at one side of the passageway for the film, being adjustable transversely into the desired position in alignment with each other for limiting the movement of the film edgewise in one direction. At the opposite side of the pathway, two lugs are provided in spaced relation to the first-named lugs transversely of the pathway for the film, the spacing being such as to accommodate a film of slightly greater width than the normal. Approximately half way between said two lugs longitudinally of the pathway, a third lug is mounted in position so as to be movable transversely of the pathway and pressed lightly by a spring toward the lugs at the opposite side of the pathway. The arrangement is such that the spring-pressed lug at one side normally holds the film lightly in engagement with the lugs at the opposite side but yields readily to permit a portion of film of increased width to pass without placing any undue tension on any of the parts. In the structure shown, means is provided also for moving the spring-pressed lug outwardly with respect to the pathway of the film for permitting easy adjustment of a fresh film into position. In this construction, the aperture shoe member which presses the film lightly into operative position is made movable forwardly out of operative pressure position, and the means for displacing the spring-pressed lug preferably comprises an arrangement by which the movement of the lug is effected automatically upon an operation of the means for moving the aperture shoe member forwardly.

It is another object of this invention to improve devices of this type in sundry details hereinafter pointed out. The preferred means by which the several objects have been attained are illustrated in the accompanying drawings, in which—

Fig. 1 is a rear face view of a portion of a projector with the light chamber housing removed at the right;

Fig. 2 is a front face view of a portion of the projector showing a front face portion of the light chamber housing and associated parts, with the lens system and the aperture shoe member and its support removed;

Fig. 3 is a top plan view of the projector on a small scale and somewhat diagrammatic;

Fig. 4 is a side view of a portion of the projector as seen from the right in Fig. 1 but with the light chamber housing in position;

Fig. 5 is a rear face view of the aperture shoe member and its supporting means as seen from the left in Fig. 4;

Fig. 6 is a vertical sectional view taken on an enlarged scale substantially at the line 6—6 of Fig. 1 with the actuating means for the aperture shoe member holding said member moved forwardly out of normal position in spaced relation to the aperture plate;

Fig. 7 is a vertical sectional view taken on an enlarged scale substantially at the line 7—7 of Fig. 1 through the aperture plate and certain of its asociated parts, but with a part of the actuating means for the aperture shoe member shown in changed position corresponding to the normal operative position of said aperture shoe member;

Fig. 8 is a rear face view of the pressure arm member mounted yieldingly in position at one side of the pathway of the film for holding the film normally in position but so as to yield readily for the passage of portions of the film of increased width;

Fig. 9 is a horizontal sectional view taken substantially at the line 9—9 of Fig. 2; and Fig. 10 is a fragmentary view taken from the right in Fig. 3 showing diagrammatically the three actuating devices by which the film is moved.

Referring now to the several figures of the drawings, in which corresponding parts are indicated by the same reference characters, 15 indicates the lamp housing of the projector as shown in Fig. 3, with a lens system means 16 projecting forwardly therefrom; at the opposite side a motor housing 17 is provided, behind which a fan chamber 18 is located. Fig. 3 shows diagrammatically a clutch control lever 19, a speed control member 20 and a framer member 21. A spindle 22 is shown in position to receive a reel of film thereon adapted to be drawn from the reel by a sprocket wheel 23.

In Fig. 10, sprocket wheels 23 and 24 are shown diagrammatically at opposite sides of the lens system 16 with a film 25 in operative position between the two sprocket wheels with an intermediate portion of the film threaded between an aperture plate 26 and an aperture shoe member 27 movably mounted with respect to the aperture plate, an arm 28 being shown in engagement with the film for giving the film an intermittent movement downwardly between the aperture plate and the aperture shoe member.

The improved construction involved herein relates to the type of structure as shown in my co-pending application Serial No. 288,296, filed August 4, 1939. It is believed to be unnecessary accordingly to describe the construction and operation in detail so far as they correspond with the disclosure of said earlier application. In the arrangement shown in Fig. 1, the actuating arm 28, by which the film 25 is given an intermittent movement, is given its series of movements by means driven by pinions 29 and 30 actuated by a gear 31. A fire-screen member 32 is pivotally mounted in position so as to swing over the pathway of the film when the parts are adjusted for discontinuing the actuation of the film, as is shown and described in my prior application Serial No. 286,134, filed July 24, 1939.

As is best shown in Fig. 6, the front wall 33 of the lamp housing 15 is provided with an opening 34 therethrough in front of which an aperture plate 35 is mounted, such plate 35 being provided with an aperture 36 for the passage of the beam of light forwardly from the lamp chamber. At the left-hand side of the plate 35 as shown in Fig. 2, a second plate 37 is adjustably mounted by means of screws 38, such plate 37 being provided with a plurality of lugs 39 in position to engage the edge of a film 25 for limiting the edgewise movement of the film toward the left in said Fig. 2. At the opposite side of the pathway for the film, two lugs 40 and 41 are fixedly mounted in position in such spaced position toward the right in Fig. 2 as to permit the passage of a film of slightly greater width than that of the film 25 shown, which is of the normal size.

In front of the aperture plate 35, I have provided a pivotally mounted arm 42 carrying at its upper end a supporting member 43 in the form of a housing having an opening 44 in its rear wall within which an aperture shoe member 45 is adapted to be mounted, such shoe member 45 having an aperture 46 therethrough in position to register with the opening 36 through the aperture plate 35. Spring means 47 is provided for holding the shoe member 45 in position within the housing member 43 as shown in Fig. 6, the arrangement being such that the shoe member can be readily withdrawn by a pull upon a handle 48 at any time when the parts are in the position as shown in said Fig. 6. The arm 42 and the parts carried thereby are normally pressed backwardly into the position as shown in Fig. 4 through the medium of a spring 49 pressing at its upper end portion against a lug 50 carried by the arm 42, as is best shown in Fig. 5.

Means is provided for moving the aperture shoe member 45 forwardly toward the right into the position as shown in Fig. 6. This means comprises a lug 51 extending backwardly from the arm 42 into position to engage a cam 52 carried by a rock shaft 53 rotatably mounted on the frame plate 33. The shaft 53 is provided at its end portion with a lever 54 by which the shaft and the cam can be turned into the position as shown in Fig. 6 for holding the aperture shoe member 45 in spaced relation to the aperture plate 35 or alternatively for permitting the spring 49 to press the shoe member into operative relation with respect to the aperture plate 35 as shown in Figs. 1 and 4.

On the rear face of the frame plate 33, I have pivotally mounted an arm 55 provided at its lower end with a lug 56 extending forwardly from the arm through openings 57 through the wall member 33 and the aperture plate 35 into position to extend through a notch 58 in the side of the aperture shoe as shown at the left in Fig. 5. As is clearly shown in Fig. 2, the arrangement is such that the lug 56 normally engages the edge of the film 25 at an intermediate point between the lugs 40 and 41 for pressing the film against the lugs 39 at the opposite side of the film.

Means is provided for pressing the lug 56 lightly toward the left in Fig. 2 for pressing the film against the lugs 39. This means comprises a second arm 59 fixedly mounted upon the arm 55, being preferably formed integrally therewith, as shown in Fig. 8. Upon the arm 59 a lug 60 is provided in position for engagement with one end portion of a spring 61 mounted upon a machine screw 62, the opposite end portion of the spring being seated below a lug 63, the arrangement being such that the spring tends normally to swing the arms 55 and 59 in counter clockwise direction in Fig. 1.

Means is also provided for swinging the arms 55 and 59 in clockwise direction in Figs. 1 and 8 for carrying the lug 56 out of engagement with the edge of the film. This means comprises a lug 64 in the form of a cam carried by the lower end portion of the arm 59 in position for operative engagement with a pin 65 carried by the rock shaft 53. The arrangement is such that when the lever 54 is operated for carrying the cam 52 into operative engagement with the lug 51 as shown in Fig. 6, the pin 65 at the same time engages the cam 64 for swinging the arms 55 and 59 in clockwise direction in Figs. 1 and 8 for carrying the lug 56 out of engagement with the edge of the film.

With the parts in the condition as illustrated in Fig. 2, the lug 56 presses the film 25 lightly against the lugs 39 at the opposite side of the pathway for the film. Whenever however a part of the film of abnormal width is presented between the lug 56 and the lugs 39 at the opposite side, the lug 56 yields readily for permitting such portion of increased width to pass easily without placing any undue strain upon the parts. When the aperture shoe member is moved forwardly into the position as shown in Fig. 6 for the insertion of a fresh film into position, the actuation of the lever 54 for causing the forward movement of the aperture shoe member serves at the same time to move the lug 56 toward the right in Fig. 2 away from the pathway of the film so as to permit ready adjustment of the film into position.

While the construction as illustrated in the drawings and as above described is preferred, it will be understood that the invention is not to be limited to such arrangement except so far as the claims may be so limited, since changes might be made in the form and arrangement of the parts without departing from the spirit of the invention.

I claim:

1. In a mechanism of the type described, the combination of a plate having an aperture therein for the passage of a beam of light therethrough, an aperture shoe member mounted in front of said plate so as to be movable toward and from the plate, spring means adapted normally to press said shoe member backwardly toward the plate for holding a film yieldingly in position against the front face of the plate, guide means on the front face of the plate at one side of the pathway for the film, an arm pivotally mounted on the rear face of said plate having a lug thereon extending forwardly through an opening in the plate at the side of the pathway for the film opposite that at which said first-named guide means is located, and spring means adapted to press said lug lightly toward said first-named guide means.

2. In a mechanism of the type described, the combination of a plate having an aperture therein for the passage of a beam of light therethrough, an aperture shoe member mounted in front of said plate so as to be movable toward and from the plate, spring means adapted normally to press said shoe member backwardly toward the plate for holding a film yieldingly in position against the front face of the plate, guide means on the front face of the plate at one side of the pathway for the film, two lugs extending forwardly from said plate at the opposite side of said pathway adapted to permit a slightly oversized film to move along said pathway, and spring-pressed means positioned between said two lugs adapted by engagement with the edge of the film to press said film lightly against said first-named guide means.

3. In a mechanism of the type described, the combination of a plate having an aperture therein for the passage of a beam of light therethrough, an aperture shoe member movable toward and from said plate, spring means adapted normally to press said shoe member lightly toward said aperture plate for holding a film yieldingly in position against said plate, fixed guide means at one side of the pathway for the film along said plate, a spring-pressed member adapted by engagement with the edge of the film at the opposite side of the pathway to press said film lightly against said fixed guide means, and manually operated means for moving said shoe member forwardly out of pressure relation to said plate and for at the same time retracting said spring-pressed member for permitting ready insertion of a film into position between said plate and said aperture shoe member.

4. In a mechanism of the type described, the combination of a plate having an aperture therein for the passage of a beam of light therethrough, an aperture shoe member mounted in front of said plate so as to be movable toward and from the plate, spring means adapted normally to press said shoe member backwardly toward the plate for holding a film yieldingly in position against the front face of the plate, guide means on the front face of the plate at one side of the pathway for the film, an arm pivotally mounted on the rear face of said plate having a lug thereon extending forwardly through an opening in the plate at the side of the pathway for the film opposite that at which said first-named guide means is located, a second arm fixedly connected with said first-named arm, a cam member on said second arm, manually operated means adapted by engagement with said cam member to swing said arms for carrying said lug away from the pathway of the film, and spring means pressing on said second arm normally urging said lug lightly into position to engage the edge of a film in said pathway.

5. In a mechanism of the type described, the combination of a plate having an aperture therein for the passage of a beam of light therethrough, an aperture shoe member mounted in front of said plate so as to be movable toward and from the plate, spring means adapted normally to press said shoe member backwardly toward the plate for holding a film yieldingly in position against the front face of the plate, guide means on the front face of the plate at one side of the pathway for the film, an arm pivotally mounted on the rear face of said plate having a lug thereon extending forwardly through an opening in the plate at the side of the pathway for the film opposite that at which said first-named guide means is located, a second arm fixedly connected with said first-named arm, manually operated means for moving said shoe member forwardly out of pressure relation to said plate, a cam member on said second arm, means adapted upon operation of said shoe moving means to engage and actuate said cam for swinging said arms so as to carry said lug away from the pathway of the film as the shoe member moves forwardly, and spring means pressing on said second arm normally urging said lug lightly into position to engage the edge of a film in said pathway.

PHILMORE F. SPERRY.